United States Patent
Schwerdtle et al.

(10) Patent No.: US 6,213,377 B1
(45) Date of Patent: *Apr. 10, 2001

(54) ULTRASONIC WELDING PROCESS AND ULTRASONIC WELDING DEVICE AND WELD PRODUCED THEREBY

(75) Inventors: Martin Schwerdtle, Schwierberdingen; Arno Altpeter, Sindelfingen, both of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/806,262
(22) PCT Filed: Jun. 3, 1995
(86) PCT No.: PCT/DE95/00726
§ 371 Date: Feb. 21, 1997
§ 102(e) Date: Feb. 21, 1997
(87) PCT Pub. No.: WO96/09134
PCT Pub. Date: Mar. 28, 1996

(30) Foreign Application Priority Data

Sep. 24, 1994 (DE) ............................................. P 44 34 132

(51) Int. Cl.[7] ................. B23K 1/06; H02K 1/28
(52) U.S. Cl. ..................... 228/110.1; 228/180.21
(58) Field of Search .............................. 228/110.1, 112.1, 228/180.21, 1.1; 310/195, 261, 234; 29/597, 598, 596

(56) References Cited

U.S. PATENT DOCUMENTS

| | | | |
|---|---|---|---|
| 4,369,910 | * 1/1983 | Hamano et al. | 228/110 |
| 4,758,293 | * 7/1988 | Samida | 156/73.1 |
| 5,198,056 | * 3/1993 | Stockli et al. | 156/73.1 |
| 5,236,543 | * 8/1993 | Riedel | 156/583.91 |
| 5,238,170 | * 8/1993 | Nuss | 228/1.1 |
| 6,140,732 | * 10/2000 | Morimoto et al. | |

* cited by examiner

Primary Examiner—Geoffrey S. Evans
Assistant Examiner—Jonathan Johns
(74) Attorney, Agent, or Firm—Michael J. Striker

(57) ABSTRACT

The invention relates to an ultrasound welding process and an ultrasound welding device for securing at least two wire ends located one above the other to contact regions of electrical parts, particularly to contact regions of laminations of commutators for rotating electrical machines or motors, having a sonotrode and having a device for introducing a contact pressure force.

It is contemplated that all the wire ends (16, 18) to be secured to at least one contact region (14) are pressed against the contact region (14) by means of the contact pressure force (F), and at the same time the sonotrode (28) sets the lower wire end (16) into oscillation transversely to the contact pressure force (F).

13 Claims, 1 Drawing Sheet

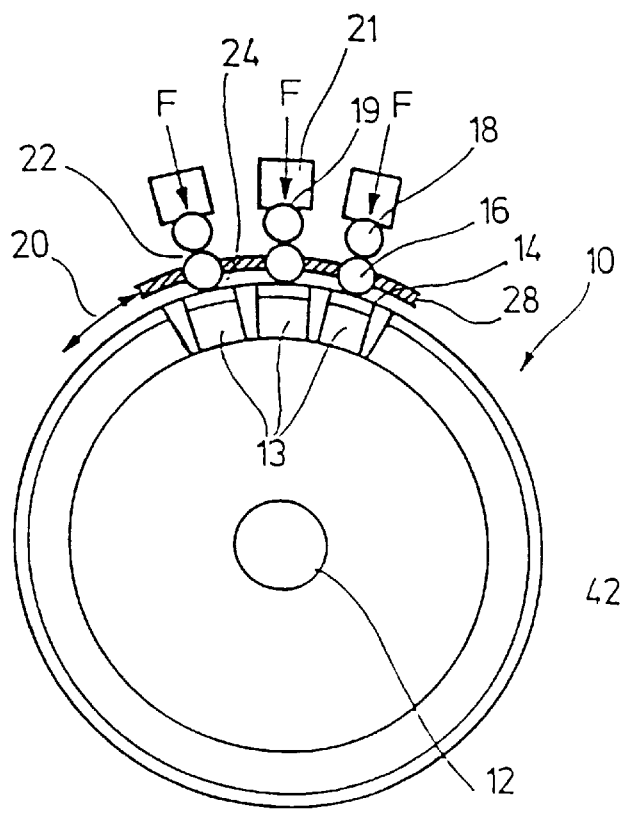
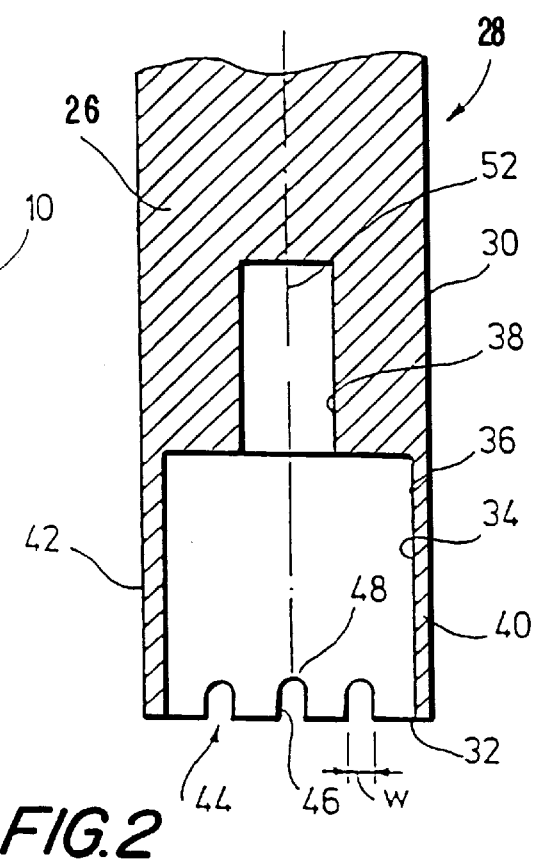
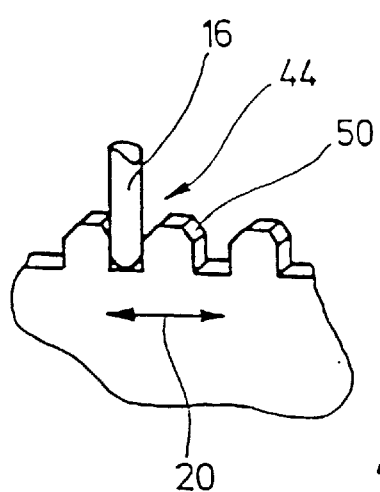
FIG. 1
FIG. 2
FIG. 3
FIG. 4

US 6,213,377 B1

ULTRASONIC WELDING PROCESS AND ULTRASONIC WELDING DEVICE AND WELD PRODUCED THEREBY

BACKGROUND OF THE INVENTION

The invention relates to an ultrasound welding process and an ultrasound welding device, and to a welding connection produced therewith.

In rotating electrical machines, such as starter drive motors for motor vehicles, it is known to insert commutators as connecting elements between rotating coils (armature winding) and the unmoving supply leads for them. To that end, the commutators have laminations insulated from one another that have contact regions, at which the beginning of one coil and the end of another coil of the armature winding are connected in accordance with the anchor wiring chosen. Thus at each contact region, there are two wire ends of the armature winding to be secured. To that end, it is known to secure the wire ends lying one above the other to the contact regions by means of a resistance diffusion welding process. To that end, one welding electrode of a welding device is connected to the commutator, and the other welding electrode is extended from outside to the outer wire end. A flow of electrical current then effects welding of the wire ends to one another and of the lower wire end to the contact region. A disadvantage here is that the wire ends require special preparation to enable them to be used for the resistance diffusion welding. As a rule, the wire ends are tin-plated for that purpose. Another disadvantage is that each lamination has to be electrically contacted individually, making it relatively time-consuming to secure all the wire ends to the commutator.

SUMMARY OF THE INVENTION

Accordingly, in accordance with the present invention all wire ends to be secured to at least one contact region are pressed against the contact region by means of the contact pressure force, and at the same time the sonotrode sets the lower wire end into oscillations transversely to the contact pressure force, and simultaneously the sonotrode sets the wire ends in oscillation transversely to the axial direction.

When the ultrasound welding process is performed in accordance with the present invention it offer the advantage over the prior art that all the wire ends can be secured simultaneously to the contact regions assigned to them, so that in the case of commutators, for instance, all the laminations of the commutator can preferably be electrically contacted simultaneously. Because the wire ends to be secured are pressed against the contact regions by means of a device that exerts a contact pressure force, and the sonotrode simultaneously causes the lower wire ends to oscillate transversely to the contact pressure direction, an excellent firmly-adhering welding connection can be established between the wire ends and the contact regions. All the welding connections are preferably produced in one operation: All the wire ends are simultaneously pressed against the contact regions each assigned to them, and the sonotrode simultaneously sets all the lower wire ends to oscillating. In a known manner, the oscillation of the lower wire ends leads to the exchange of lattice structures, thus producing a firm welding connection at the points where the wire ends lying one above the other and the lower wire end and the contact region touch. Because as a rule the wire ends are rounded, the touch points are relatively small, so that only a relatively small energy input via the sonotrode is necessary. Hence the sonotrode need be designed for merely a relatively small amplitude range of mechanical ultrasonic oscillation that is transmitted to the lower wire ends.

In an advantageous embodiment of the invention, the sonotrode is embodied as a torsion sonotrode, which advantageously has at least a number of receiving regions that corresponds to the number of wire ends to be secured simultaneously. With its receiving regions, the sonotrode can engage the lower wire ends positively, so that by means of torsional oscillation of the sonotrode, the lower wire ends can at the same time be set to oscillating. Because the sonotrode is designed as a torsion sonotrode, the total free space required for the torsion sonotrode is also relatively small, which allows a simultaneous engagement of all the lower wire ends. Because of the design of the torsion sonotrode, the ultrasound welding process can be incorporated in a simple way into production, for instance into a mounting cycle line for producing commutators for electrical machines or motors. Because of the simultaneous securing of all the wire ends, only a relatively short mounting time is needed to secure the wire ends, so that a short total cycle time can be adhered to.

It is also advantageous if the device for introducing a contact pressure force has radially shiftable clamping members that guide or grasp the outer wire ends and that are preferably pneumatically or hydraulically actuatable. Bringing the sonotrode to the lower wire ends can thus be coupled with the device for imposing the contact pressure force, so that overall a very compact ultrasound welding device that requires little free space is created. A substantially uniform introduction of force to all the wire ends to be secured can be achieved with the radially shiftable clamping members, which are preferably formed by clamping jaws of a clamping tube. By means of the clamping members, self-adjustment of the entire ultrasound welding device is simultaneously performed, thereby assuring that the sonotrode with its receiving regions can detect the lower wire ends exactly. To that end, the receiving regions may be embodied as sonotrode recesses that have an inlet phase, so that once again a self-adjusted positioning of the sonotrode is possible.

Further advantageous features of the invention will becomes apparent from the other characteristics recited in the dependent claims.

BRIEF DESCRIPTION OF THE DRAWINGS

The invention will be described in further detail below in terms of an exemplary embodiment in conjunction with the associated drawings. Shown are:

FIG. 1, a schematic fragmentary view of a commutator;

FIG. 2, a schematic longitudinal section through a sonotrode;

FIG. 3, a schematic plan view of a sonotrode; and

FIG. 4, a fragmentary developed view of a sonotrode.

DESCRIPTION OF THE PREFERRED EMBODIMENT

FIG. 1 schematically shows a commutator, identified overall by reference numeral 10, in a fragmentary view. The commutator 10 is disposed on an armature shaft 12 of an electrical machine or motor, not shown, such as a starter drive motor for motor vehicles. The commutator 10 has laminations 13, insulated from one another, to each of which one contact region 14 is assigned. Depending on the number of laminations, a corresponding number of contact regions 14 is distributed over the circumference of the commutator 10; the drawing, for clarity, merely shows three laminations 13 with their connection or contact regions 14. On the contact region 14, there is a lower row of wire ends 16, and above it an upper row of wire ends 18. The wire ends 16 and 18 lead to coils, producing an armature winding, inside the armature; these coils are hard-wired in a selectable way, depending on the use of the electrical machine or motor. To secure the wire ends 16 and 18 lying one above the other to one another and to the contact regions 14, or in other words to make an electrically conductive connection, an ultrasound welding process is used according to the invention. To this end, the outer wire ends 18 are received in axial guides 19 of clamping elements 21 and are acted upon by these elements with a contact pressure force F, while the lower wire ends 16 are simultaneously set into oscillation by an annular torsion sonotrode 28 to be described in further detail hereinafter. The lower wire ends 16 oscillate in the direction represented here by the double-headed arrow 20. The oscillation plane of the lower wire ends 16 is thus, in accordance with the direction of oscillation 20, transverse to the contact pressure force F. Because of the oscillation of the lower wire ends 16, ultrasound welding process occurs at the touch points 22 between the lower and upper wire ends 16 and 18 and the touch points 24 between the lower wire ends 16 and the contact regions 14. Because the touch points 22 and 24 (which actually are touch faces) are relatively small in area, a durably adhering cold welding can take place between the wire ends 16 and 18 and between the wire ends 16 and the contact regions 14, despite a relatively slight input of energy via the sonotrode. The sonotrode has a torsion amplitude of approximately 50 $\mu$m, for instance, or in other words a total torsion path of approximately 100 $\mu$m, which is mechanically transmitted to the wire ends 16 in the ultrasonic frequency range.

FIG. 2 shows an oscillating head 26 of a sonotrode 28. The sonotrode 28 has a cylindrical base body 30, into which a stepped bore 34 is introduced from one face end 32. The stepped bore 34 has a larger-diameter region 36, which merges with an inner, smaller-diameter region 38. The diameter of the region 36 is approximately equivalent to the diameter of the connection region of the commutator 10. The diameter of the region 38 is selected such that it is larger than a diameter of the armature shaft 12. Thus the base body 30 has a tubular extension 40 that is formed by a wall 42 surrounding the region 36. The extension 40, on its face end 32, has receiving regions 44 which are distributed over the circumference of the extension 40. The spacing with which the receiving regions 44 are distributed over the circumference of the extension 40 corresponds to the arrangement of the lower wire ends 16 over the circumference of the commutator 10. The receiving regions 44 are formed by peripherally open apertures through the extension 40. A base 48 of the apertures 46 is semicircular, for instance. The apertures 46 have a width w, which is equivalent to the diameter of the lower wire ends 16.

In the plane view of the sonotrode 28 shown in FIG. 3, seen from the side toward the lower wire ends 16, it can be clearly seen that the receiving regions 44 are spaced apart from one another accordingly over the circumference of the extension 40. The region 38 of the stepped bore 34, into which in FIG. 3 one looks as it were from above, is embodied such that when a sonotrode 28 is brought to the commutator 10, a stub that protrudes there from the armature shaft 12 can project inward without causing any touch between the sonotrode 28 and the armature shaft 12. The sonotrode 28 is brought to the commutator 10 via a suitable device, so that the lower wire ends 16, with their face ends toward the sonotrode 28, engage the receiving regions 44.

In FIG. 4, a detail of a developed view of the extension 40 is shown, with a lower wire end 16 introduced into a receiving region 44. For better introduction of the lower wire ends 16, the recesses 46 may have chamfers 50, which thus favors self-centering of the sonotrode 28 relative to the lower wire ends 16.

Via an oscillation drive, not shown, the sonotrode 28 is set into mechanical torsional oscillations relative to its longitudinal axis 52 (FIG. 2) in the ultrasonic frequency range, and these oscillations are transmitted to the lower wire ends 16. Since the diameter of the lower wire ends 16 is equivalent to the width W of the apertures 46, the lower wire ends 16 rest with positive engagement on the extension 40, so that a substantially loss-free transmission of the ultrasonic oscillations is possible. Because of the oscillations of the lower wire ends 16, these ends undergo a relative motion with respect to the upper wire ends 18 and the contact regions 14. As a result, with simultaneous application of the contact pressure force F, cold welding takes place on the one hand at the touch points 22 between the lower wire ends 16 and the upper wire ends 18 and on the other at the touch points 24 between the lower wire ends 16 and the contact regions 14. The contact pressure force F is brought to bear by the clamping elements 21. These elements may be part of an apparatus, not shown, which to that end is preferably tubular in shape or has a suitably shaped recess that allows all the outer wire ends 18 to be grasped simultaneously. By actuation of clamping elements 21, which can be shifted in the radial direction in accordance with the direction of action of the contact pressure force F, a uniform contact pressure force F can be exerted on the outer wire ends.

The invention is understood not to be limited to the exemplary embodiment described here. Other devices are also conceivable that simultaneously set all the lower wire ends 16 into relative motion with respect to the upper wire ends 18 and the contact regions 14, so that a simultaneous cold welding of all the securing points of the commutator 10 is done. Because of the simultaneous welding of all the touch points, a very time-saving and hence economical electrical contacting of the wire ends 16 and 18 is possible, which can readily be incorporated into a production and mounting process that proceeds automatically.

The principle illustrated in the exemplary embodiment is understood to be adoptable to the electrical contacting of a plurality of wire ends or wire regions located one above the other, in that given suitable positional fixation of the wire ends, for instance by engagement by a contact pressure force F, the various adjacent wire ends are set into relative motion with respect to one another, so that a welding connection is made between the touch points of the wire ends. In the electrical contacting of wire ends located side by side and one above the other, the sonotrode may moreover have a comb structure, for instance, which has corresponding recesses for receiving the wire ends. In that case, the sonotrode is set into linear oscillations, which—as noted—result in the welding connections. This is advantageous for instance also for electrically contacting single or plural side-by-side plug connections, switch contacts, electrodes or the like, if a plurality of connection wires are to be attached to their contact regions.

What is claimed is:

1. An ultrasound welding process for securing at least two wire ends located one above the other to contact regions of electrical parts, particularly to contact regions of laminations of commutators for rotating electrical machines or motors, having sonotrode setting the wire ends into oscillation and having a device for introducing a contact force to the wire ends, comprising the steps of pressing all the wire ends (16, 18) to be secured to at least one contact region (14) simultaneously against the contact region (14) by means of the contact force (F), simultaneously setting the lower wire end (16) resting on the contact region (14) into oscillation by the sonotrode (28); functionally separating the sonotrode and the device (21) for introducing a contact force; imparting to the lower wire ends (16) ultrasound oscillations by the sonotrode (21); and holding the device (21) for introducing a contact force removable during the oscillations of the sonotrode (28) on the upper wire end (18).

2. The ultrasound welding process of claim 1, characterized in that the wire ends (16, 18) to be secured in all the contact regions (14) are simultaneously pressed against their contact regions (14), and all the lower wire ends (16) are simultaneously set into oscillation by the sonotrode (28) transversely to the contact force (F).

3. An ultrasound welding device for performing a method as defined by claim 1, characterized in that the device for introducing the contact force (F) has clamping members (21) with guides (19) for the outer wire ends (18), and that the sonotrode (28) has receiving regions (44) for receiving the wire ends (16), which correspond at least to the number of lower wire ends (16) to be secured simultaneously.

4. The ultrasound welding device of claim 1, characterized in that the receiving regions (44) are formed by apertures (46) in the extension (40) that are peripherally open toward the face end (32).

5. The ultrasound welding device of claim 1, characterized in that a base (48) of each of the apertures (46) forms a stop for the end faces of the wire ends (16).

6. The ultrasound welding device of claim 1, characterized in that a width (w) of the apertures (46) is equivalent to a diameter of the wire ends (16).

7. The ultrasound welding device of claim 1, characterized in that a diameter of the extension (40) is equivalent to a diameter of an imaginary circular line on which the lower wire ends (16) are located.

8. The ultrasound welding device of claim 1, characterized in that the device for introducing the contact pressure force (F) has radially shiftable clamping elements (21) that grasp the outer wire ends (18).

9. The ultrasound welding device of claim 1, characterized in that the clamping elements (21) are pneumatically or hydraulically actuatable.

10. The ultrasound welding device of claim 1, characterized in that the sonotrode (28) is a torsion sonotrode.

11. A welding connection made by a method of claim 1, characterized in that the lower ones of the wire ends (16, 18) located one above the other is welded at its touch points (22, 24) to the wire ends (18) located above it on the one hand and to the contact region (14), assigned to it, of the electrical part (10, 13) on the other.

12. An ultrasound welding process for securing at least two wire ends located one above the other to contact regions of electrical parts, particularly to contact regions of laminations of commutators for rotating electrical machines or motors, having sonotrode and having a device for introducing a contact force to the wire ends, comprising the steps of pressing all the wire ends (16, 18) to be secured to at least one contact region (14) against the contact region (14) by means of the contact force (F), simultaneously setting the lower wire end (16) resting on the contact region (14) into oscillation by the sonotrode (28) transversely to the contact force (F), providing the device for introducing the contact force (F) with clamping members (21) with guides (19) for the outer wire ends (18), providing the sonotrode (28) with receiving regions (44) for receiving the wire ends which correspond at least to the number of lower wire ends (16) to be secured simultaneously, and providing in the sonotrode (28) a tubular extension (40) on whose face end (32) the receiving regions (44) are disposed.

13. An ultrasound welding process for securing at least two wire ends located one above the other to contact regions of electrical parts, particularly to contact regions of laminations of commutators for rotating electrical machines or motors, having sonotrode and having a device for introducing a contact force to the wire ends, comprising the steps of pressing all the wire ends (16, 18) to be secured to at least one contact region (14) against the contact region (14) by means of the contact force (F), simultaneously setting the lower wire end (16) resting on the contact region (14) into oscillation by the sonotrode (28) transversely to the contact force (F), providing the device for introducing the contact force (F) with clamping members (21) with guides (19) for the outer wire ends (18), providing the sonotrode (28) with receiving regions (44) for receiving the wire ends (16), which correspond at least to the number of lower wire ends (16) to be secured simultaneously, forming the receiving regions (44) by appertures (46) in the extension (40) that are peripherally open to the phase end (32), and providing the apertures (46) with a chamfer (50) in the direction of the face end (32).

* * * * *